(12) United States Patent
Peet et al.

(10) Patent No.: US 7,261,814 B2
(45) Date of Patent: Aug. 28, 2007

(54) NON-PLANAR MEDIA TRANSMISSION FILTER APPARATUS AND METHOD

(75) Inventors: C. Alan Peet, Waterman, IL (US); James Wolford, Chicago, IL (US); Abe Khalil, Lake Barrington, IL (US); Markus Beer, Morsbach (DE)

(73) Assignee: SPX Corporation, Charlotte, NC (US)

( * ) Notice: Subject to any disclaimer, the term of this patent is extended or adjusted under 35 U.S.C. 154(b) by 397 days.

(21) Appl. No.: 10/827,428

(22) Filed: Apr. 20, 2004

(65) Prior Publication Data

US 2005/0230324 A1 Oct. 20, 2005

(51) Int. Cl.
*B01D 29/07* (2006.01)
*B01D 35/30* (2006.01)

(52) U.S. Cl. .................. 210/232; 210/445; 210/493.1; 210/493.3

(58) Field of Classification Search ................ 210/232, 210/168, 445, 493.1, 493.3
See application file for complete search history.

(56) References Cited

U.S. PATENT DOCUMENTS

| | | | | |
|---|---|---|---|---|
| 4,352,737 A | 10/1982 | Taniguchi | ................. | 210/455 |
| 4,617,122 A | 10/1986 | Kruse et al. | ............. | 210/493.3 |
| 5,750,021 A | 5/1998 | Liang | .................. | 210/86 |
| 5,853,577 A * | 12/1998 | Gizowski et al. | ........... | 210/168 |
| 5,863,424 A | 1/1999 | Lee | ............................ | 210/168 |
| 5,885,455 A | 3/1999 | Graus et al. | ................ | 210/445 |
| 6,183,632 B1 | 2/2001 | Covington | .................. | 210/168 |
| 6,616,836 B1 | 9/2003 | Covington | .................. | 210/172 |
| 6,827,848 B2 | 12/2004 | Covington | .................. | 210/172 |

FOREIGN PATENT DOCUMENTS

| | | | |
|---|---|---|---|
| JP | 02-81609 | | 6/1990 |
| JP | 02-081609 U | * | 6/1990 |
| JP | 06-71117 | | 3/1994 |
| JP | 06-071117 A | * | 3/1994 |
| JP | 08028376 | | 1/1996 |

OTHER PUBLICATIONS

Masaharu Suzuki, et al, Development of a High-Filtration-Ratio ATF Strainer, Source: Honda R&D Technical Review, vol. 14 No. 2 (Oct. 2002).

* cited by examiner

*Primary Examiner*—Thomas M. Lithgow
(74) *Attorney, Agent, or Firm*—Baker & Hostetler LLP

(57) ABSTRACT

A filter for use in engines or transmissions is provided comprising an inlet-side cover having a wave-like region along the periphery of the inlet-side cover, an outlet-side cover having a wave-like region along the periphery of the outlet-side cover where the outlet-side cover wave-like region is in a complementary alignment with the inlet-side cover wave-like region and filter media fixed in a non-planar configuration between the wave-like regions of the inlet-side and outlet-side covers.

21 Claims, 9 Drawing Sheets

NON-PLANAR MEDIA TRANSMISSION FILTER APPARATUS AND METHOD

FIELD OF THE INVENTION

The present invention relates generally to transmission or engine filters. More particularly, the present invention relates to non-planar media suction filters for transmissions or engines.

BACKGROUND OF THE INVENTION

In response to industry demand, transmission and engine manufacturers continue to optimize the size of their transmissions and engines. Accordingly, transmission and engine manufacturers have required smaller components from their suppliers. The imposition of smaller spatial constraints has introduced a number of challenges to suppliers of transmission and engine components, particularly in the area of filtration.

In many cases, spatial constraints have reduced the available footprint for a powertrain filter. The reduced filter footprint has reduced the available filter media surface area inside the filter. In some cases, the reduced surface area provided by conventional filter media and filter designs has introduced a number of problems including maintaining a low pressure differential across the filter during cold start-up as well as during high temperature operating conditions. As one skilled in the art will readily appreciate, maintaining a low pressure differential across the filter during cold start facilitates quick priming of the fluid pump. As one skilled in the art will also appreciate, maintaining a low pressure differential across the filter during hot operation prevents pump cavitation.

One approach to providing a low pressure differential across a filter, given a limited packaging space, has been to use less efficient filtration media. Less efficient media is less restrictive, which permits fluids to pass through the media more freely, resulting in a lower pressure differential. One drawback to this approach, however, is that using filter media that is less efficient allows larger contaminants to pass through the filter. Allowing larger contaminants to pass through the filter media is not desirable because the presence of large contaminants in the system may lead to poor shift quality or premature failure of the transmission. Another drawback to this approach is that as the filter gets smaller, the available media area also reduces causing the velocity through the media to increase resulting in lower filtration efficiency.

Another approach to providing a low pressure differential across a filter given a limited surface area has been to increase the surface area of the filter media by using it in a non-planar configuration. The most predominant non-planar media configuration that substantially improves surface area is pleating. Pleating the filter media provides a greater surface area than filter media used in a conventional bag or single layer filter configuration. The increased surface area of the filter media serves to lower the pressure differential across the filter media. One of the drawbacks to prior filter design approaches using pleated filter media is that these designs are expensive. Prior pleated filter designs have been more expensive to manufacture than a conventional transmission filter. One prior design approach requires several plastic joining operations whereas the manufacturing process for a conventional filter having media in single layer or bag format may only require one plastic joining or metal crimping operation. For example, one design of prior pleated filters requires a separate manufacturing process to form the filter media into pleats by creating a pleat-pack by way of over-molding or urethane casting. Once a pleat pack has been manufactured, the pleat pack is joined in a first plastic joining operation to a first cover and then joined to a second cover in a separate plastic joining operation. Another drawback to pleated existing non-planar media configurations is that they hold the media in a "saw-tooth" configuration in which the fluid cross-section, in the direction of fluid flow, decreases along the pleat until reaching a line at the apex of the pleat. This reduction in fluid flow area results in a higher pressure differential than would be provided by gradually reducing fluid cross-section as would be provided by more of a "trapezoidal wave" or sinusoidal non-planar fold media configuration. Some designs that make use of standard pleats hold the filter media folded at a very tight angle, perhaps as small as 15°. In such a design, the initial pleating operation may damage the media at the outset. Another drawback of such a design is that by holding the media at tight angles under high fluid velocities may result in media damage and cause lower filtration efficiency.

Accordingly, it is desirable to provide a transmission filter with a sufficiently low pressure differential across filter media within given spatial constraints without reducing the efficiency of the filter media, thereby permitting large contaminants to pass through the filter. It is also desirable to provide a transmission filter design with adequate filter media surface area without incurring the manufacturing expense or design drawbacks of prior pleated filter designs.

SUMMARY OF THE INVENTION

The foregoing needs are met, to a great extent, by the present invention, wherein in one aspect an apparatus is provided that increases the surface area of transmission filter media while avoiding the expense incurred by prior pleated filter designs.

In accordance with one embodiment of the present invention, a filter for use in engines or transmissions is provided which includes an inlet-side cover having a wave-like region along the periphery of the inlet-side cover, an outlet-side cover having a wave-like region along the periphery of the outlet-side cover where the outlet-side cover wave-like region is in complementary alignment with the inlet-side cover wave-like region and filter media fixed in a non-planar configuration between the wave-like regions of the inlet-side and outlet-side covers. These wave like regions could take several forms including but not limited to sinusoidal-like or more similar to a trapezoidal-wave.

In accordance with another embodiment of the present invention, a filter for use in engines or transmissions is provided which includes an inlet-side cover having inlet-side media supports and a non-planar region along the periphery of the inlet-side cover, an outlet-side cover having outlet-side media supports and a non-planar region along the periphery of the outlet-side cover where the outlet-side cover non-planar region is complementary in shape and alignment with the inlet-side cover non-planar region and filter media fixed in a non-planar configuration between the non-planar regions of the inlet-side and outlet-side covers.

In accordance with another embodiment of the present invention a filter for use in engines or transmissions is provided which includes an inlet-side cover having alternating convex and concave regions along the periphery of the inlet-side cover, an outlet-side cover having alternating convex and concave regions along the periphery of the outlet-side cover which are in a complementary alignment with the convex and concave regions of the inlet-side cover and filter media fixed in a non-planar configuration between the alternating convex and concave regions of the inlet-side cover and the outlet-side cover.

In accordance with yet another embodiment of the present invention a filter for use in engines or transmissions is provided which includes an inlet-side cover with media retention tray having convex and concave regions along the periphery, an outlet-side cover having alternating convex and concave regions along the periphery of the outlet-side cover which are in a complementary alignment with the convex and concave regions of the inlet-side cover and filter media fixed in a non-planar configuration between the alternating convex and concave regions of the inlet-side cover and the outlet-side cover.

There has thus been outlined, rather broadly, certain embodiments of the invention in order that the detailed description thereof may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
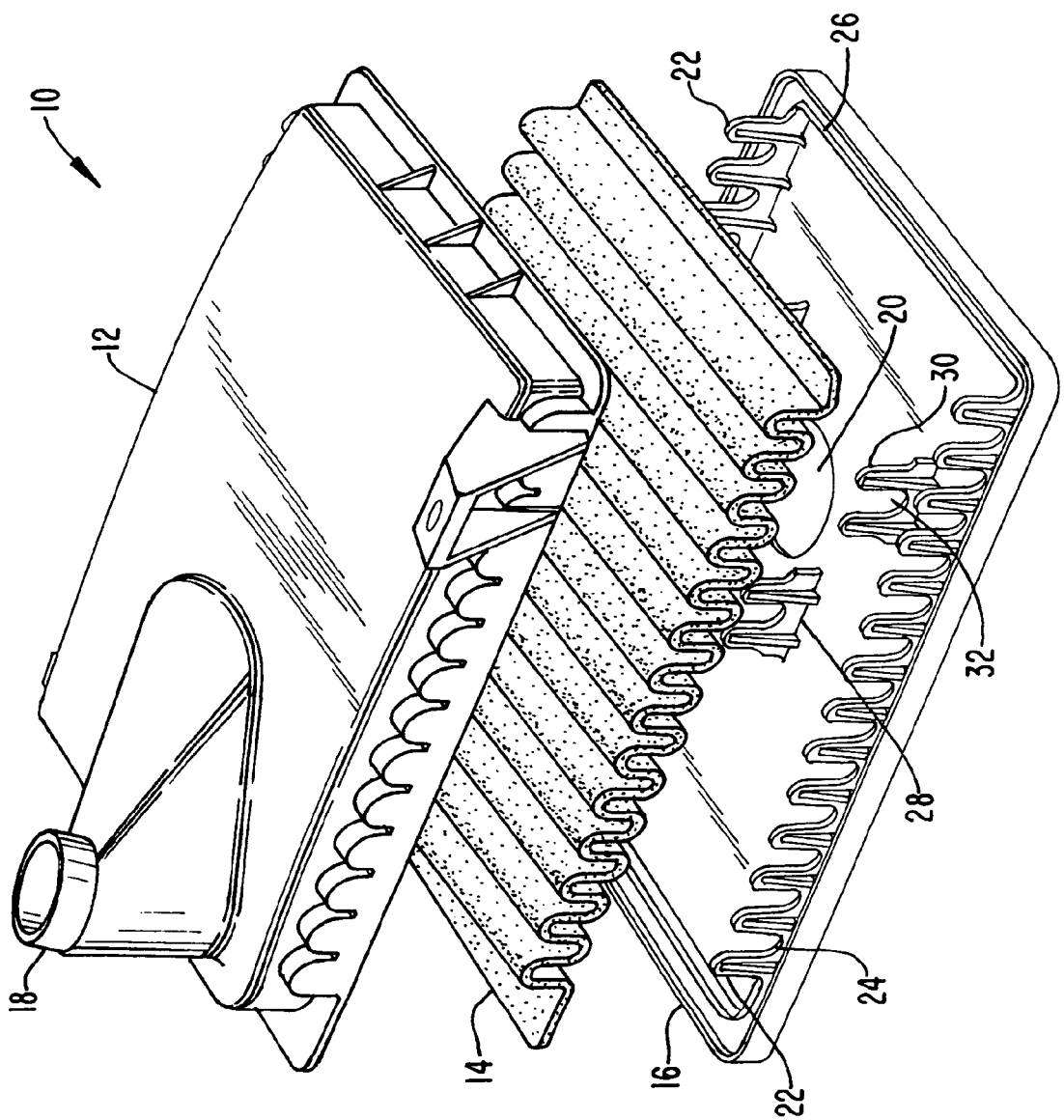
FIG. 1 is a perspective view illustrating components of a transmission filter according to a preferred embodiment of the invention.

The invention will now be described with reference to the drawing figures, in which like reference numerals refer to like parts throughout. An embodiment in accordance with the present invention provides increased filter media surface area over the surface area that would be available using a conventional filter design having media in single-layer or bag configuration. The increased filter media surface area provided by a filter in accordance with the present invention is necessary to provide a low pressure differential across filter media when it would not be possible to do so with a conventional filter designs in a reduced filter footprint. Another benefit of a filter in accordance with the present invention is that the design permits the components of the filter to be joined using a single joining operation. A single joining operation reduces the time and expense required to manufacture a filter. Another benefit of a filter in accordance with the present invention is that the non-planar media shape can be configured to minimize pressure differential without damaging the media.

An embodiment of the present inventive apparatus is illustrated in FIG. 1. FIG. 1 is a perspective view illustrating components of a transmission filter 10 which includes an outlet-side cover 12, filter media 14 and an inlet-side cover 16. The outlet-side cover 12 further includes a fluid outlet 18 and the inlet-side cover 16 includes a fluid inlet 20. In a preferred embodiment, the outlet-side cover 12 and inlet-side cover 16 are thermoplastic, however, other materials including a combination of materials such as thermoplastic and metal may be used.

In a preferred embodiment the filter media 14 is non-woven felt that is approximately 2 mm thick. It should be noted that other filter media materials, thicknesses, configurations and combinations of different filter media materials may be used. For example, the filter media may include non-woven polyester material bonded with a polyester screen backing.

It should also be noted that while the filter media 14 is shown in a sinusoidal-like configuration, other non-planar configurations may be used. For example, the media may be used in a undulated, corrugated or in another wave-like configuration. The shape of the pleats may be contoured for lower pressure differential without requiring non-standard pleating operations, such as heat forming or insert-molding. The shape of the pleat is introduced to the filter media 14 when it is installed in the outlet-side cover 12.

According to a preferred embodiment of the invention, the outlet-side cover 12 and the inlet-side cover 16 are joined using a single plastic-to-plastic bonding process such as vibration welding, however, other plastic bonding processes including laser welding and ultrasonic welding may also be employed. It should be appreciated that other joining processes, such as crimping, may be used in accordance with the invention when practiced with composite or metal materials.

The inlet-side cover 16 includes a plurality of media retention fingers 22 and media retention recesses 24 positioned along the periphery of two sides of the inlet-side cover 16. The inlet-side cover 16 also includes a crimp rib 26 which runs along the periphery of the inlet-side cover 16.

The crimp rib 26 also runs along the upper portion of the media retention fingers 22 and media retention recesses 24.

The inlet-side cover 16 also includes one or more media supports 28. According to a preferred embodiment in accordance with the preferred invention, the media supports 28 further include one or more media support fingers 30 and media support recesses 32. The orientation of the media supports 28 is such that the media support fingers 30 and media support recessions 32 are aligned with the respective media retention fingers 22 and media retention recesses 24 positioned along the periphery of the inlet-side cover 16. The media supports 28 keep the filter media 14 properly oriented. It should also be noted that the number and position of the media supports 28 may be optimized for a particular application of the filter 10.

Figure 2:
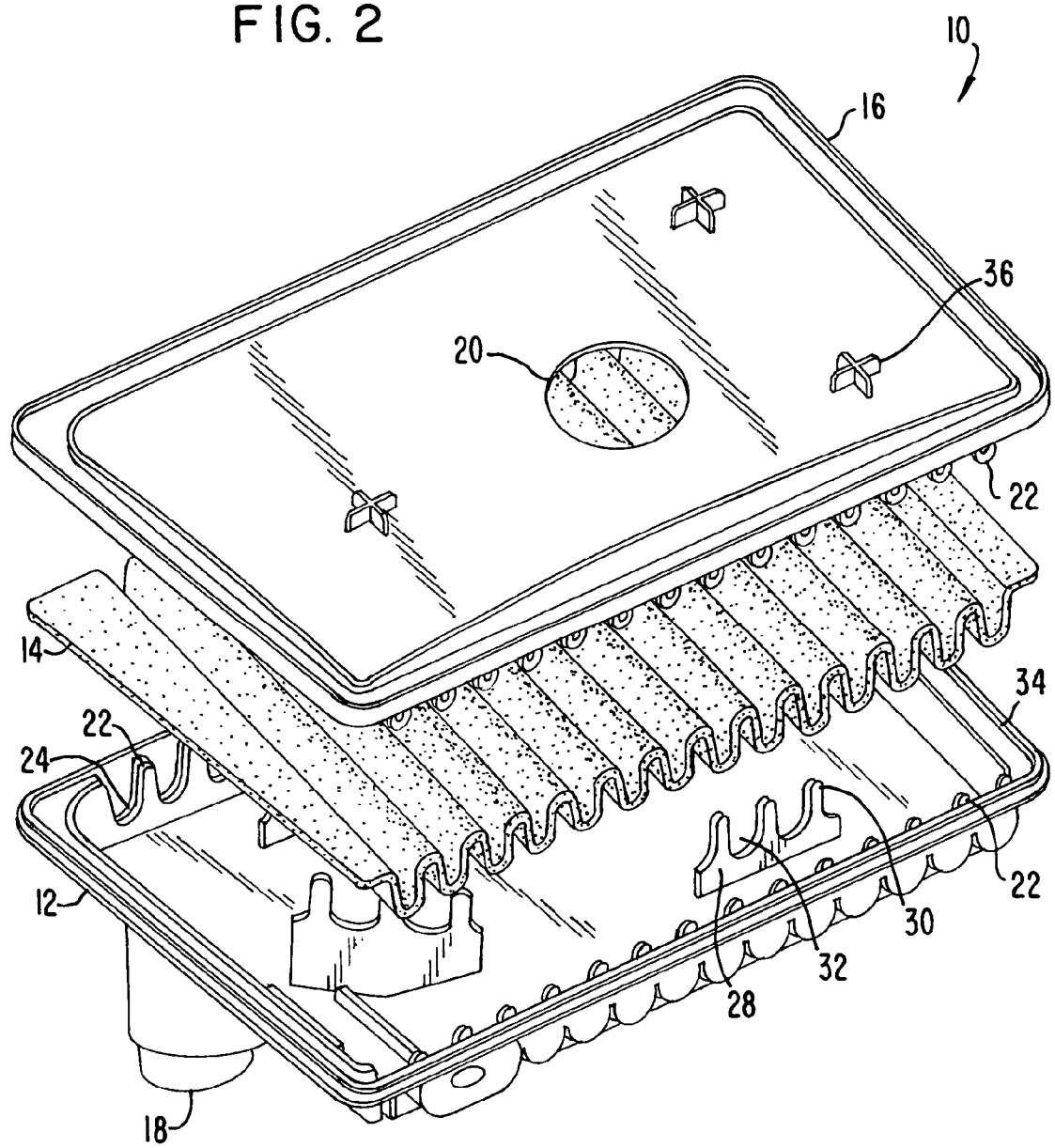
FIG. 2 is a perspective view illustrating an alternate view of the components of the transmission filter of FIG. 1.

FIG. 2 is a perspective view illustrating an alternate view of the components of the transmission filter of FIG. 1. As previously described with respect to FIG. 1, the transmission filter 10 includes an outlet-side cover 12, filter media 14 and an inlet-side cover 16. The outlet-side cover 12 further includes a fluid outlet 18 and the inlet-side cover 16 includes a fluid inlet 20. Also shown on the inlet-side cover 16 are a plurality of media retention fingers 22. Present, but not visible on the inlet-side cover 16, are a plurality of media retention recesses 24 as were described with respect to FIG. 1. FIG. 2 also provides a view of the underside of the inlet-side cover 16. The underside of the inlet-side cover 16 includes a plurality of spacer elements 36 which provide separation between fluid inlet 20 of the inlet-side cover 16 and a transmission pan.

The outlet-side cover 12 includes a plurality of media retention fingers 22 and media retention recesses 24 arranged along the periphery of two sides of the outlet-side cover 12. The media retention fingers 22 and recesses 24 of the outlet-side cover 12 are aligned so they interface with the media retention recesses 24 and fingers 22, respectively, of the inlet-side cover 16. The outlet-side cover 12 also includes a crimp recess 34 which is aligned to interface the crimp rib 26 of the inlet-side cover 16 when the covers are joined. The crimp recess 34 runs along the entire periphery of the outlet-side cover 12 and along the upper portion of the media retention fingers 22 and media retention recesses 24 thereon.

The outlet-side cover 12 includes one or more media supports 28 which include one or more media support fingers 30 and media support recesses 32. As was the case with the inlet-side cover 16, the orientation of the media supports 28 in the outlet-side cover 12 is such that the media support fingers 30 and the media support recesses 32 are aligned with the respective media retention fingers 22 and media retention recesses 24 positioned along the periphery of the outlet-side cover 12.

The media supports 28 of the inlet-side cover 16 are lined up with the media supports 28 of the outlet-side cover 12 so the media supports 28 of the outlet-side cover 12 support the filter media 14 while the media supports 28 of the inlet-side cover 16 serve as a stop to prevent deflection of the inlet-side 16 and outlet-side 12 covers under suction conditions. Additionally, the media supports 28 of the inlet-side cover 16 and outlet-side cover 12 are sized so a small gap remains between the respective media support fingers 30 and media support recesses 32 when the filter is assembled. This slight gap controls filter collapse under suction conditions.

Figure 3:
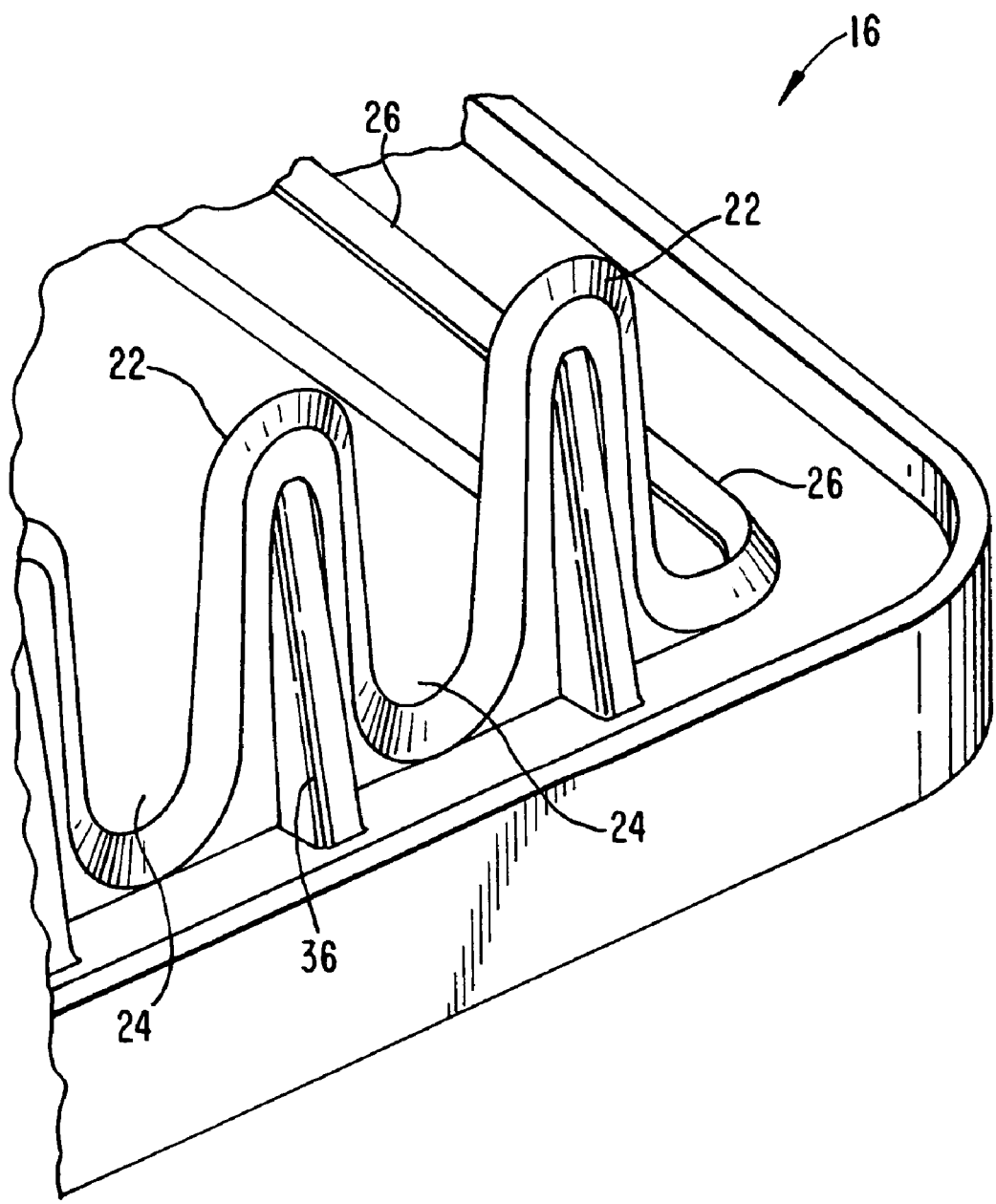
FIG. 3 is a sectional view of an inlet-side cover of a transmission filter according to a preferred embodiment of the invention.

FIG. 3 is a sectional view of an inlet-side cover 16 of a transmission filter according to a preferred embodiment of the invention. FIG. 3 shows media retention fingers 22 and media retention recesses 24 as well as a crimp rib 26 formed along the tops of the fingers 22 and recesses 24. The crimp rib 26 is continuous along the periphery of the inlet-side cover. It should be noted that other means of securing the filter media such as spikes may be used in addition to, or in place of the crimp rib 26. The media retention finger 22 also includes a support rib 36 in this embodiment.

Figure 4:
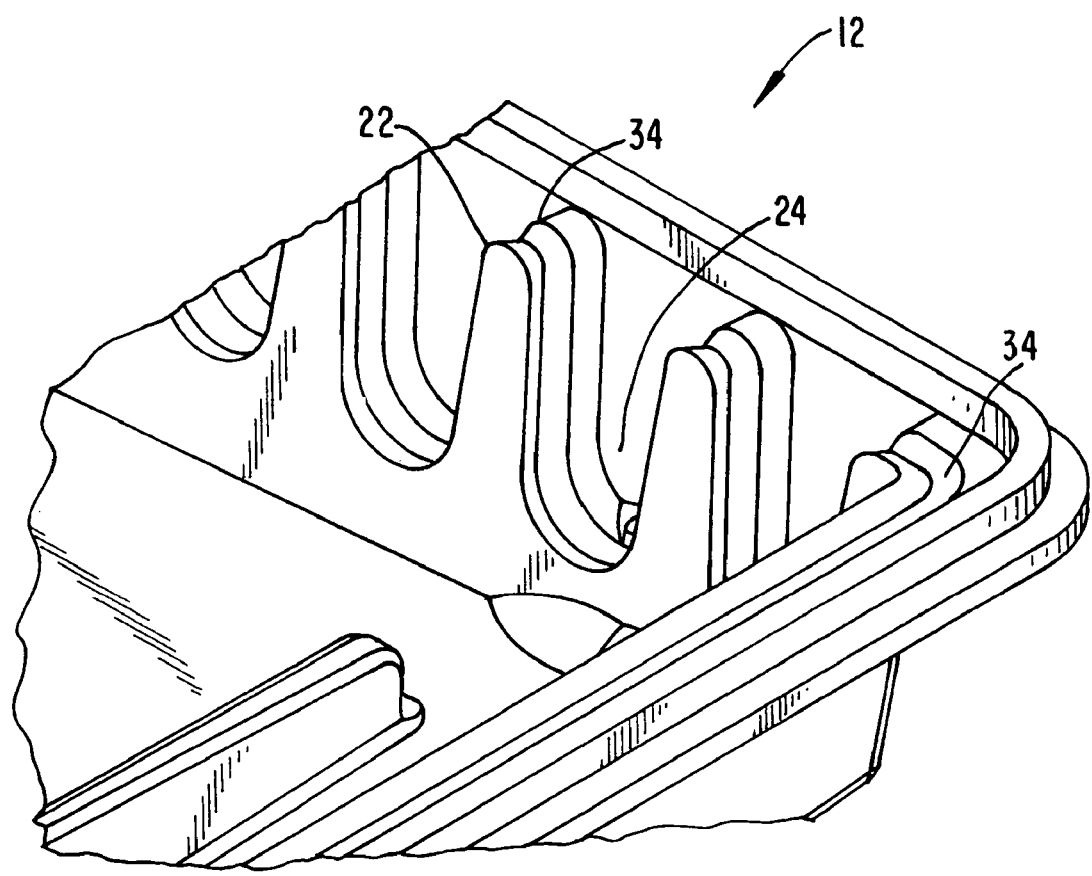
FIG. 4 is a sectional view of an outlet-side cover of a transmission filter according to a preferred embodiment of the invention.

FIG. 4 is a sectional view of an outlet-side cover of a transmission filter according to a preferred embodiment of the invention. FIG. 4 shows media retention fingers 22 and media retention recesses 24 and the crimp recess 34 formed along the tops of the fingers 22 and recesses 24.

Figure 5:
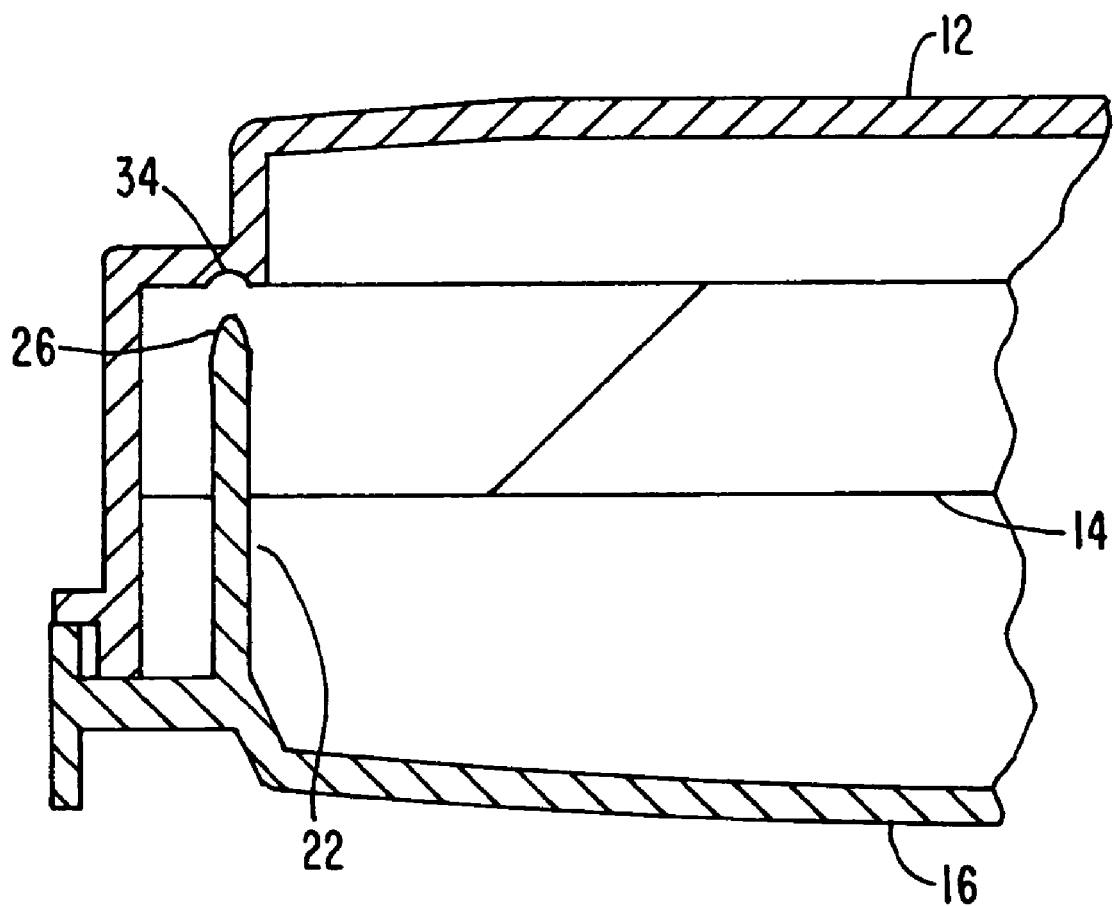
FIG. 5 is a width-oriented cutaway view illustrating a section of the transmission filter according to a preferred embodiment of the invention.

FIG. 5 is a width oriented cutaway view illustrating a section of the transmission filter according to a preferred embodiment of the invention. FIG. 5 shows the filter media 14 crimped in place between the media retention fingers 22 and media retention recesses 24 of the outlet-side cover 12 and the inlet-side cover 16. The filter media 14 is most compressed between the crimp rib 26 and the crimp recess 34.

Figure 6:
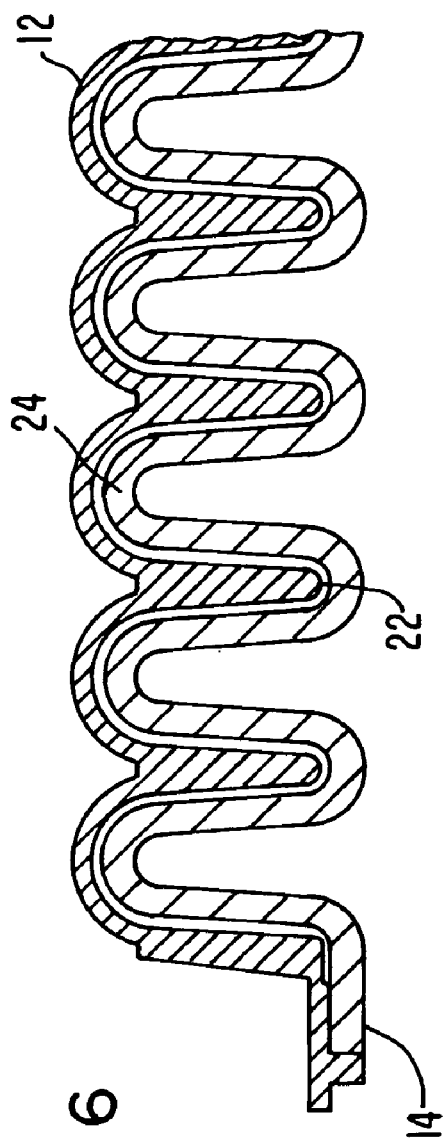
FIG. 6 is a cutaway view illustrating a lateral section of an outlet-side cover of a transmission filter according to a preferred embodiment of the invention.

FIG. 6 is a cutaway view illustrating a lateral section of an outlet-side cover of a transmission filter according to a preferred embodiment of the invention. The pleated shape is introduced to the filter media 14 when the media is applied to the outlet-side cover 12 and conforms to the contours of the media retention fingers 22 and media retention recesses 24 along the periphery of the cover.

Figure 7:
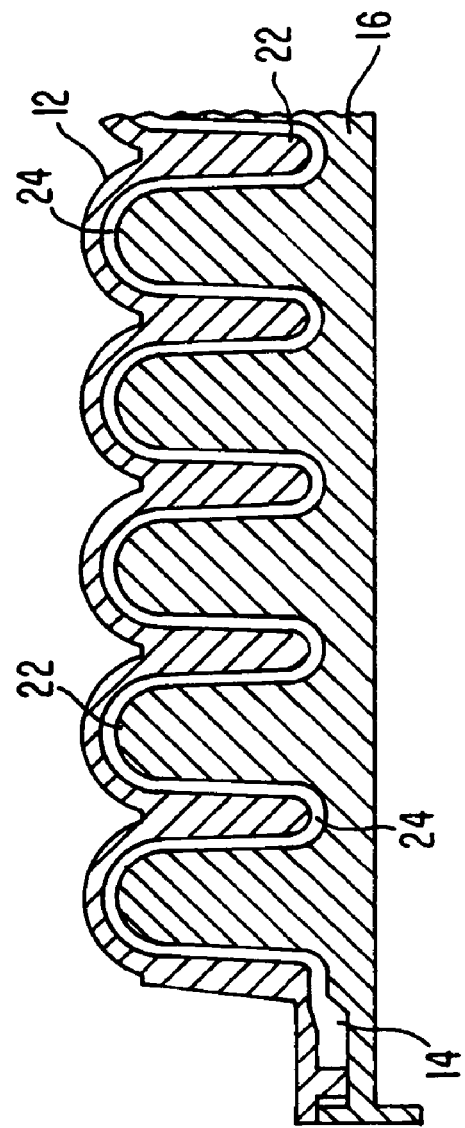
FIG. 7 is a cutaway view illustrating a lateral section of a transmission filter according to a preferred embodiment of the invention.

FIG. 7 is a cutaway view illustrating a lateral section of a transmission filter according to a preferred embodiment of the invention. The filter media 14 is held in a pleated configuration when it is compressed between the media retention fingers 22 of the inlet-side cover 16 and the media retention recesses 24 of the outlet-side cover 12 and vice-versa when the filter is assembled.

Figure 8:
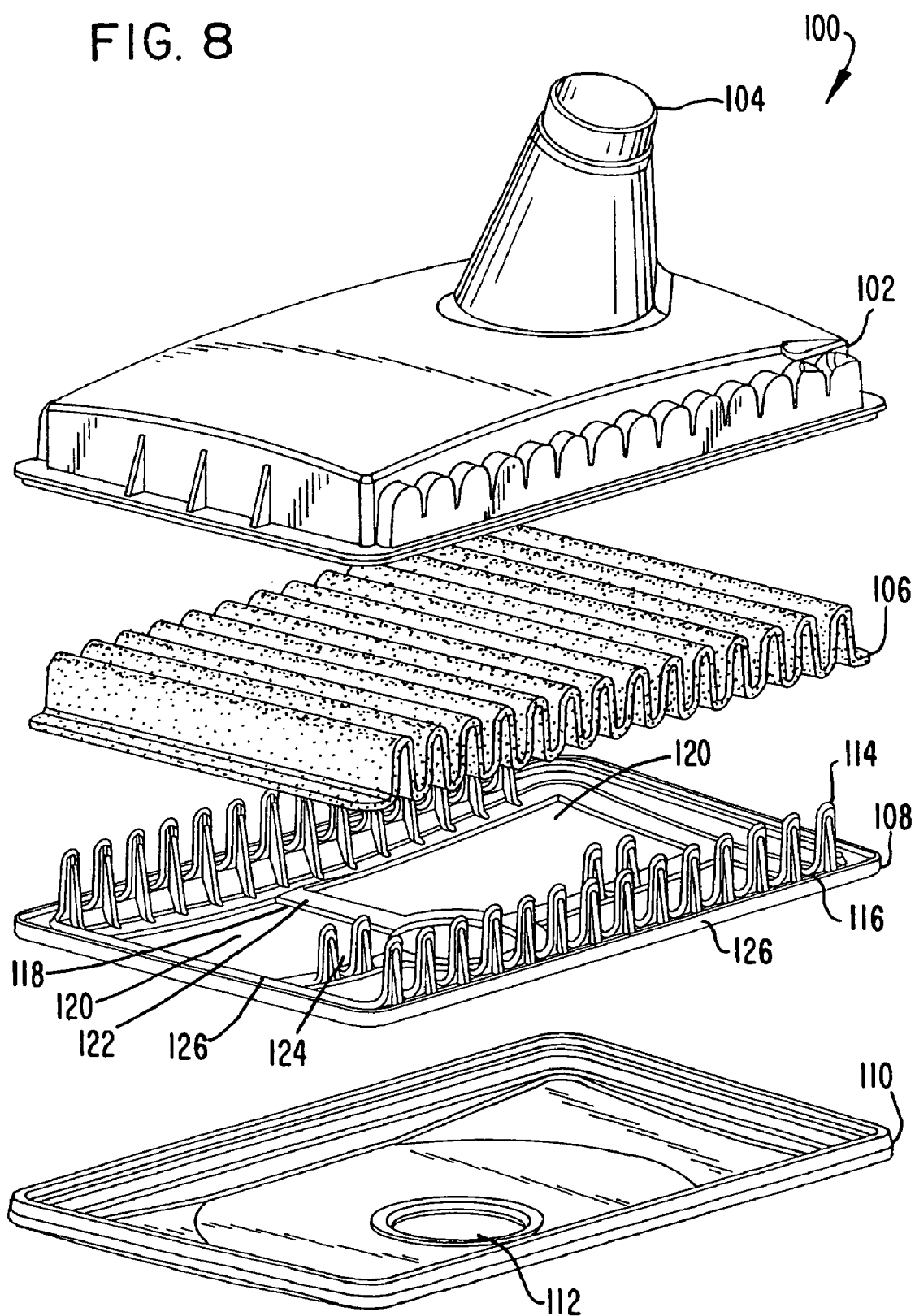
FIG. 8 is a perspective view illustrating components of a transmission filter according to an alternate preferred embodiment of the invention.

FIG. 8 is a perspective view illustrating components of a transmission filter according to an alternate preferred embodiment of the invention. FIG. 8 shows a transmission filter 100 which includes an outlet-side cover 102, filter media 106, media retention tray 108, and an inlet-side cover 110. The media retention tray 108 is positioned between the inlet-side cover 110 and the filter media 106. The outlet-side cover 102 further includes a fluid outlet 104 and the inlet-side cover 110 includes a fluid inlet 112.

In an alternate preferred embodiment in accordance with the present invention, the inlet-side cover 110 is metal and the outlet-side cover 102 and media retention tray 108 are thermoplastic, however, it will be readily appreciated by one skilled in the art that other materials may be used for the outlet-side cover 102, the media retention tray 108 and inlet-side cover 110. In accordance with an alternate preferred embodiment of the present invention, the filter media 106 is crimped between the media retention tray 108 and the outlet-side cover 102 during filter assembly. The media retention tray 108 is held in position by the inlet-side cover 110 when the outlet-side cover 102 and the inlet-side cover 110 are joined together using a crimping operation. An advantage of using a crimping operation to join the covers is that a crimping operating is faster and typically more economical than a plastic joining operation.

The media retention tray 108 includes a plurality of media retention fingers 114 and media retention recesses 116 positioned along the periphery of two sides of the media retention tray 108. The media retention tray 108 also includes a crimp rib 126 which runs along the periphery of the media retention tray 108. The crimp rib 126 also runs along the upper portion of the media retention fingers 114 and media retention recesses 116.

The media retention tray 108 also includes a frame 118 and one or more media supports 120 positioned thereon. It should be noted that media retention tray 108 may also include a full tray bottom with a fluid inlet and is not limited to using the frame 118 shown in FIG. 8. According to a preferred embodiment in accordance with the preferred invention, the media supports 120 further include one or more media support fingers 122 and media support recesses 124. The orientation of the media supports 120 is such that the media support fingers 122 and media support recesses 124 are aligned with the respective media retention fingers 114 and media retention recesses 116 positioned along the periphery of the media retention tray 108. The media supports 120 keep the filter media 106 properly oriented. It should also be noted that the number and position of the media supports 120 may be optimized for a particular application of the filter 100.

Figure 9:
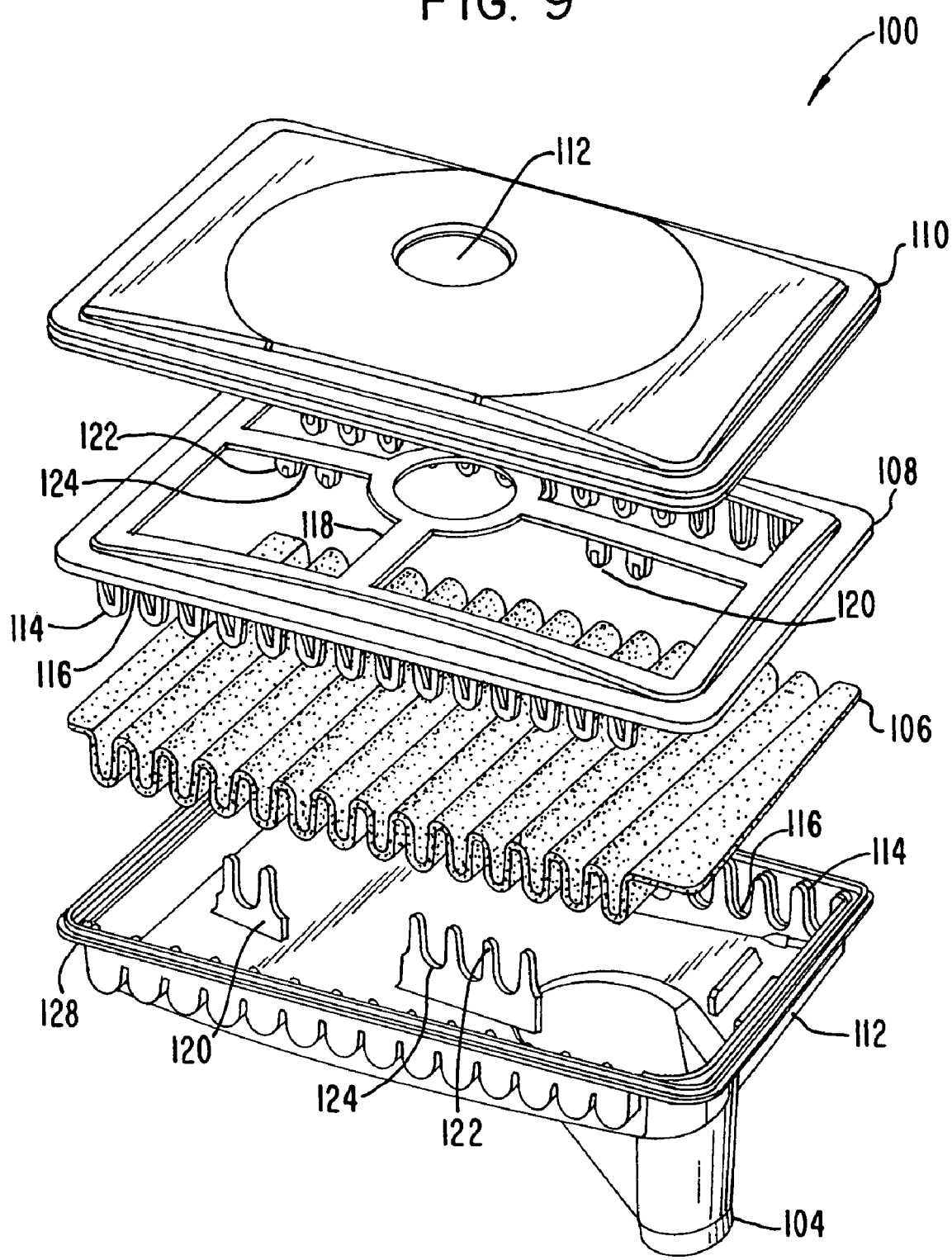
FIG. 9 is a perspective view illustrating an alternate view of the components of the transmission filter of FIG. 8.

FIG. 9 is a perspective view illustrating an alternate view of the components of the transmission filter of FIG. 8. As previously described with respect to FIG. 8, the transmission filter 100 includes an outlet-side cover 102, filter media 106, a media retention tray 108, and an inlet-side cover 110. The media retention tray 108 is positioned between the inlet-side cover 110 and the filter media 106. The outlet-side cover 102 further includes a fluid outlet 104 and the inlet-side cover 110 includes a fluid inlet 112.

The outlet-side cover 102 includes a plurality of media retention fingers 114 and media retention recesses 116 arranged along the periphery of two sides of the outlet-side cover 102. The media retention fingers 114 and recesses 116 of the outlet-side cover 102 are aligned so they interface with the media retention recesses 116 and fingers 114, respectively, of the media retention tray 108. The outlet-side cover 102 also includes a crimp recess 128 which is aligned to interface the crimp rib 126 of the media retention tray 108 when the inlet-side cover 110 and outlet-side covers are joined. The crimp recess 128 runs along the entire periphery of the outlet-side cover 102 and along the upper portion of the media retention fingers 114 and media retention recesses 116 thereon.

The outlet-side cover 102 includes one or more media supports 120 which include one or more media support fingers 122 and media support recesses 124. As was the case with the media retention tray 108, the orientation of the media supports 120 in the outlet-side cover 102 is such that the media support fingers 122 and the media support recesses 124 are aligned with the respective media retention fingers 122 and media retention recesses 124 positioned along the periphery of the outlet-side cover 102.

The media supports 120 of the media retention tray 108 are lined up with the media supports 120 of the outlet-side cover 102 so the media supports 120 of the outlet-side cover 102 support the filter media 106 while the media supports 120 of the media retention tray 108 serve as a stop to prevent deflection of the inlet-side 110 and outlet-side 102 covers under suction conditions. Additionally, the media supports 120 of the media retention tray 108 and outlet-side cover 102 are sized so a small gap remains between the respective media support fingers 122 and media support recesses 124 when the filter is assembled. This slight gap controls filter collapse under suction conditions.

Figure 10:
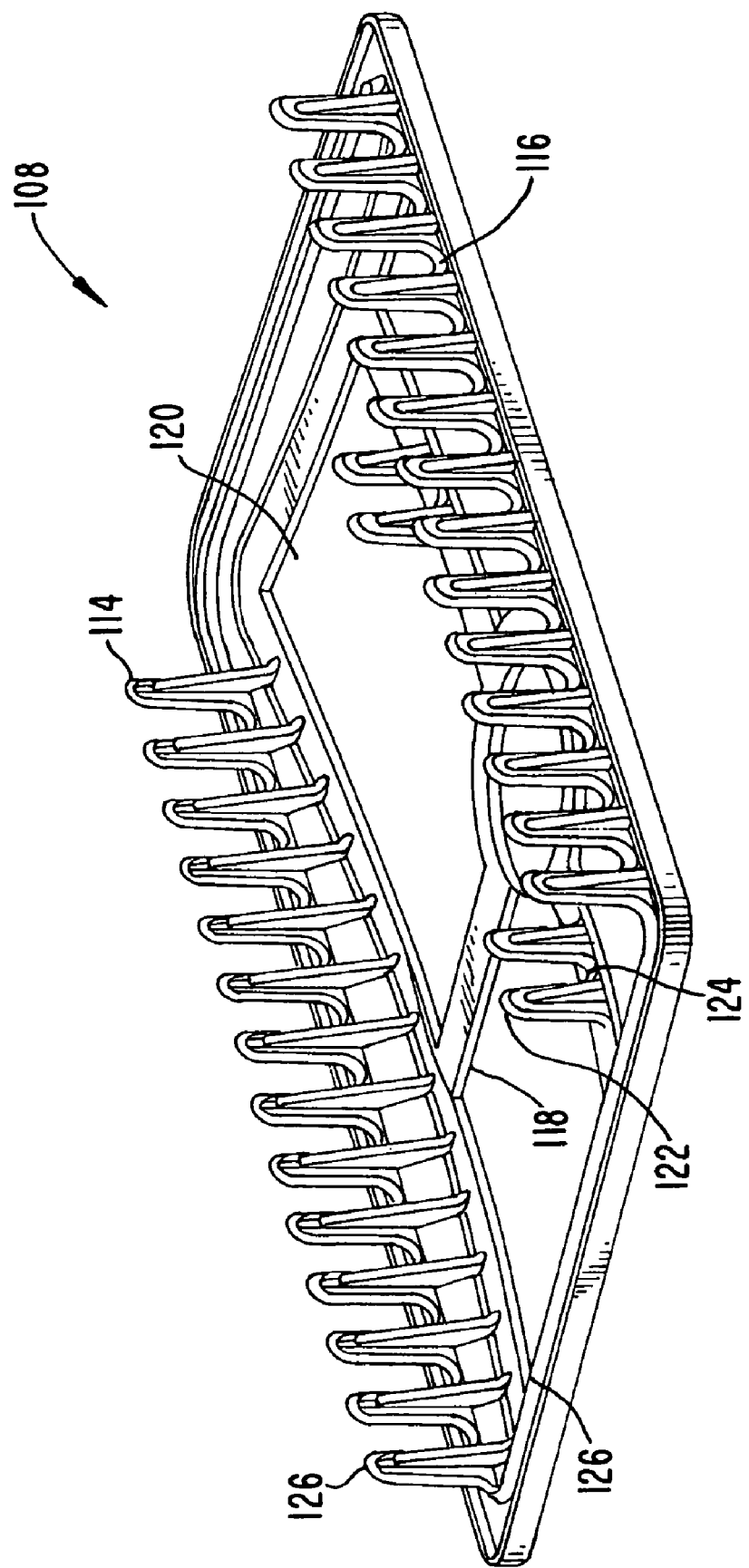
FIG. 10 is a perspective view illustrating a media retention tray according to an alternate embodiment of the invention.

FIG. 10 is a perspective view illustrating a media retention tray according to an alternate preferred embodiment of the invention. FIG. 10 shows a media retention tray 108 with a plurality of media retention fingers 114 and media retention recesses 116 positioned along the periphery of two sides of the media retention tray 108. The media retention tray 108 also includes a crimp rib 126 which runs along the periphery of the media retention tray 108. The crimp rib 126 also runs along the upper portion of the media retention fingers 114 and media retention recesses 116. The media retention tray 108 also includes a frame 118 and one or more media supports 120 positioned thereon. It should be noted that the size of the frame 118 may be adjusted to suit the particular application of the filter. Accordingly, as previously mentioned, the number and position of media supports 120 may be adjusted to suit the particular application of the filter.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A filter for use in engines or transmissions, comprising:
an inlet-side cover having a wave-like region along the periphery of said inlet-side cover, wherein said inlet-side cover further comprises at least one wave-like shaped inlet-side filter media support, separate from said wave-like region along the periphery, disposed within the periphery of said inlet-side cover;
an outlet-side cover having a wave-like region along the periphery of said outlet-side cover, wherein said outlet-side cover wave-like region is in a generally complementary alignment with said inlet-side cover wave-like region along the periphery, wherein said outlet-side cover further comprises at least one wave-like shaped outlet-side filter media support, separate from said wave-like region along the periphery, of the outlet-side cover disposed within the periphery of said outlet-side cover, wherein the inlet-side filter media support aliens with the outlet-side filter media support; and
a filter media fixed in a non-planar configuration between said wave-like regions of said inlet-side and outlet-side covers.

2. The filter of claim 1, wherein said inlet-side cover further comprises media retention means disposed along the periphery of said inlet-side cover.

3. The filter of claim 1, wherein said outlet-side cover further comprises media retention means disposed along the periphery of said outlet-side cover.

4. The filter of claim 1, wherein said inlet-side cover further comprises media retention means disposed along the periphery of said inlet-side cover and said outlet-side cover further comprises media retention means disposed along the periphery of said outlet-side cover.

5. The filter of claim 1, wherein said inlet-side cover further comprises a crimp rib disposed along said wave-like region of said inlet-side cover and said outlet-side cover further comprises a crimp recess disposed along said wave-like region of said outlet-side cover.

6. The filter of claim 1, wherein said inlet-side cover further comprises a crimp rib disposed along the periphery of said inlet-side cover and said outlet-side cover further comprises a crimp recess disposed along the periphery of said outlet-side cover.

7. The filter of claim 1, wherein said inlet-side and outlet-side covers are joined by a single joining operation.

8. The filter of claim 1, wherein said inlet-side cover is thermoplastic.

9. The filter of claim 1, wherein said outlet-side cover is thermoplastic.

10. The filter of claim 1, wherein said inlet-side cover and said outlet-side covers are thermoplastic.

11. The filter of claim 1, wherein said inlet-side cover and said outlet-side covers are thermoplastic and joined by a single plastic-to-plastic bonding operation.

12. The filter of claim 1, wherein the inlet-side filter media support comprises one or more media support fingers and media support recesses.

13. The filter of claim 1, wherein the outlet-side filter media support comprises one or more media support fingers and media support recesses.

14. The filter of claim 1, wherein the inlet-side filter media support comprises one or more media support fingers and media support recesses, wherein the outlet-side filter media support comprises one or more media support fingers and media support recesses, wherein the inlet-filter media support and the outlet-side filter support are complementary with each other such that the filter media is secured between the inlet-side filter media support and the outlet-side filter media support.

15. A filter for use in engines or transmissions, comprising:
an inlet-side cover having alternating convex and concave regions along the periphery of said inlet-side cover, wherein said inlet-side cover further comprises at least one alternating convex and concave inlet-side filter media support, separate from said alternating convex and concave regions along the periphery, disposed within the periphery of said inlet-side cover;
an outlet-side cover having alternating convex and concave regions along the periphery of said outlet-side cover which are in complementary alignment with said convex and concave regions along the periphery of said inlet-side cover, wherein said outlet-side cover further comprises at least one alternating convex and concave outlet-side filter media support, separate from said alternating convex and concave regions along the periphery, disposed within the periphery of said outlet-side cover, wherein the inlet-side filter media support aligns with the outlet-side filter media support; and
a filter media fixed in a wave-like configuration between said alternating convex and concave regions of said inlet-side cover and said outlet-side cover.

16. The filter of claim 15, wherein said at least one outlet-side filter media support includes an alternating convex and concave region in alignment with said alternating convex and concave region along the periphery of said outlet-side cover.

17. The filter of claim 15, wherein the filter media is secured between the inlet-side filter media support and the outlet-side filter media support.

18. A filter for use in engines or transmissions, comprising:
an inlet-side cover having a wave-like region along the periphery of said inlet-side cover and one or more wave-like shaped inlet-side media supports, separate from said wave-like region along the periphery, disposed within the periphery of said inlet-side cover;
an outlet-side cover having a wave-like region along the periphery of said outlet-side cover and outlet-side wave-like shaped media supports, separate from said wave-like region along the periphery, disposed within said outlet-side cover, wherein said outlet-side cover wave-like region along the periphery is complementary in shape and alignment with the periphery of said inlet-side cover wave-like region, wherein the inlet-side filter media support aligns with the outlet-side filter media support; and
a filter media fixed in a wave-like configuration between said wave-like regions of said inlet-side cover and said outlet-side cover.

19. The filter of claim 18, wherein said inlet-side media supports and said outlet-side media supports are sized so that a gap is created between said inlet-side and said outlet-side media supports when the filter is assembled.

20. The filter of claim 18, wherein the filter media is secured between the inlet-side filter media support and the outlet-side filter media support.

21. A filter for use in engines or transmissions, comprising:
an inlet-side cover means having a wave-like region along the periphery of said inlet-side cover means, wherein said inlet-side cover means further comprises at least one wave-like shaped inlet-side filter media support means, separate from said inlet-side cover wave-like region along the periphery, disposed within the periphery of said inlet-side cover means;
an outlet-side cover means having a wave-like region along the periphery of said outlet-side cover means, wherein said outlet-side cover means further comprises at least one wave-like shaped outlet-side filter media support means, separate from said outlet-side cover wave-like region along the periphery, disposed within the periphery of said outlet-side cover means, wherein the inlet-side filter media support means aligns with the outlet side filter media support means; and
a filter media means sealingly fixed in a non-planar configuration between said wave-like regions of said inlet-side cover means and said outlet-side cover means.

* * * * *

UNITED STATES PATENT AND TRADEMARK OFFICE
CERTIFICATE OF CORRECTION

PATENT NO.        : 7,261,814 B2                                                Page 1 of 1
APPLICATION NO.   : 10/827428
DATED             : August 28, 2007
INVENTOR(S)       : C. Alan Peet et al.

It is certified that error appears in the above-identified patent and that said Letters Patent is hereby corrected as shown below:

Column 8
Line 38, please replace "aliens" with --aligns--;

Column 10
Lines 9-10, please replace "and outlet-side wave-like shaped media supports" with
--and wave-like shaped outlet-side media supports--.

Signed and Sealed this

Fifth Day of January, 2010

David J. Kappos
*Director of the United States Patent and Trademark Office*